United States Patent Office 3,444,178
Patented May 13, 1969

3,444,178
CERTAIN HALOGENATED 2-(2-THIAZOLYL) AMINOFURAN-5-ONES
Gerald L. Bachman, Kirkwood, Mo., assignor to Monsanto Company, St. Louis, Mo., a corporation of Delaware
No Drawing. Filed June 16, 1967, Ser. No. 646,447
Int. Cl. C07d *91/34;* C07c *53/32*
U.S. Cl. 260—306.8
9 Claims

ABSTRACT OF THE DISCLOSURE

This disclosure covers halogenated thiazolylamino furanones and their synthesis from the appropriate 2-aminothiazole and 4-oxo-2-butenoic acid.

---

This invention relates to a novel class of organic chemical compounds. More particularly, this invention is concerned with novel thiazolylamino derivatives of certain halogenated furan-5-ones. Such materials have been found to possess useful and unexpected biological activity.

The novel compounds of this invention have the formula

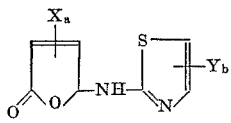

wherein X and Y are each selected from chlorine and bromine, $a$ is an integer from one to two, and $b$ is an integer from zero to two.

The novel furanones of this invention can be readily prepared by reacting a halogenated or unhalogenated aminothiazole with a halogenated 4-oxo-2-butenoic acid. A typical reaction is illustrated by the following equation:

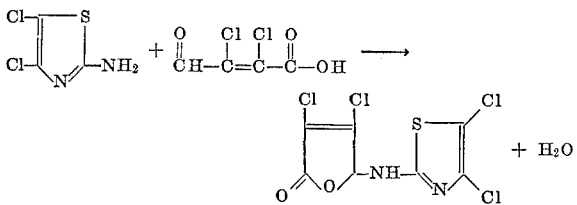

It is preferred to carry out the reaction in the presence of an inert organic solvent. Suitable solvents include the lower alkanols such as methanol, ethanol, and the like. The reaction temperatures employed in the preparation of the compounds of this invention will vary from room temperature to the reflux temperature of the reaction mixture. The specific temperature employed in any given preparation will be primarily dependent upon the particular reactants used therein.

The invention will be more fully understood by reference to the following examples which are set forth herein for the purpose of illustration only and which are not to be construed as limiting the scope of this invention in any manner.

EXAMPLE 1

A suitable reaction vessel is charged with a solution of 3.4 grams (0.02 mole) of mucochloric acid in 50 ml. of methanol. There is added 2.7 grams (0.02 mole) of 2-amino-5-chlorothiazole in 100 ml. of methanol. These starting materials are stirred and heated at reflux temperature for about 2 hours. The solvent is then removed by evaporation at reduced pressure. Residual solids are filtered out to yield 2.2 grams of 2-[2-(5-chlorothiazolyl)amino]-3,4-dichlorofuran-5-one as a brown oil.

EXAMPLE 2

Following the detailed procedure set forth in Example 1, the reactants employed are 3.6 grams of 2-amino-4-bromothiazole and 5.2 grams of mucobromic acid. The product obtained is 2-[2-(4-bromothiazolyl)amino]-3,4-dibromofuran-5-one.

EXAMPLE 3

Following the detailed procedure set forth in Example 1, the reactants employed are 2.7 grams of 2-amino-4-chlorothiazole and 2.7 grams of 2-chloro-4-oxo-2-butenoic acid. The product obtained is 2-[2-(4-chlorothiazolyl)amino]-3-chlorofuran-5-one.

EXAMPLE 4

Following the detailed procedure set forth in Example 1, the reactants employed are 2.0 grams of 2-aminothiazole and 3.6 grams of 3-bromo-4-oxo-2-butenoic acid. The product obtained is 2-(2-thiazolylamino)-4-bromofuran-5-one.

EXAMPLE 5

Following the detailed procedure set forth in Example 1, the reactants employed are 3.4 grams of 2-amino-4,5-dichlorothiazole and 2.7 grams of 3-chloro-4-oxo-2-butenoic acid. The product obtained is 2-[2-(4,5-dichlorothiazolyl)amino]-4-chlorofuran-5-one.

EXAMPLE 6

Following the detailed procedure set forth in Example 1, the reactants employed are 3.6 grams of 2-amino-5-bromothiazole and 3.4 grams of mucochloric acid. The product obtained is 2-[2-(5-bromothiazolyl)amino]-3,4-dichlorofuran-5-one.

As stated above, the products of the present invention are useful as microbiocides adapted to be employed for the control of bacterial organisms. In a standard screening test, 2-[2-(5-chlorothiazolyl)amino]-3,4-dichlorofuran-5-one is found to be effective against both *Staphylococcus aureus*, a representative gram positive species, and *Salmonella typhosa*, a representative gram negative species, at a dilution in excess of 1 part per million. Similar activity is displayed by other and different thiazolylamino halogenated furanones of this invention.

While the invention has been described herein with regard to certain specific embodiments, it is not so limited. It is to be understood that variations and modifications thereof may be made by those skilled in the art without departing from the spirit and scope of the invention.

The embodiments of the invention in which an exclusive property or privilege is claimed are defined as follows:

1. A compound of the formula

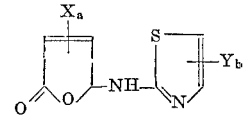

wherein X and Y are each selected from chlorine and bromine, $a$ is an integer from one to two, and $b$ is an integer from zero to two.

2. A compound as defined in claim 1 wherein X and Y are chlorine.

3. A compound as defined in claim 1 wherein X and Y are bromine.

4. A compound as defined in claim 1 wherein $a$ and $b$ are each one.

5. A compound as defined in claim 1 wherein $a$ and $b$ are each two.

6. A compound as defined in claim 1 wherein $a+b$ is equal to three.

7. A compound as defined in claim 2 wherein $a+b$ is equal to three.

8. A compound as defined in claim 3 wherein $a+b$ is equal to three.

9. 2-[2-(5-chlorothiazolyl)amino]-3,4-dichlorofuran-5-one.

References Cited

UNITED STATES PATENTS 3,149,119  9/1964  Ebetino _____ 260—306.8

ALEX MAZEL, *Primary Examiner.*

R. J. GALLAGHER, *Assistant Examiner.*

U.S. Cl. X.R.

260—539, 999